(12) United States Patent
Lee

(10) Patent No.: US 6,570,919 B1
(45) Date of Patent: May 27, 2003

(54) ITERATIVE DECODING OF DATA PACKETS EMPLOYING DECISION FEEDBACK EQUALIZATION

(75) Inventor: Inkyu Lee, Kearny, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/363,743

(22) Filed: Jul. 30, 1999

(51) Int. Cl.[7] ................................................. H03K 5/08
(52) U.S. Cl. ........................................ 375/233; 375/232
(58) Field of Search ................................. 375/232, 233, 375/340, 341, 348, 346, 350; 714/755, 759, 774, 786, 794, 795

(56) References Cited

U.S. PATENT DOCUMENTS

| | | | | |
|---|---|---|---|---|
| 4,539,690 A | * | 9/1985 | Speidel ........................ | 375/232 |
| 5,031,195 A | * | 7/1991 | Chevillat et al. ............ | 375/234 |
| 5,761,248 A | * | 6/1998 | Hagenauer et al. .......... | 375/340 |
| 5,822,143 A | * | 10/1998 | Cloke et al. .................... | 360/51 |
| 5,862,156 A | * | 1/1999 | Huszar et al. ............... | 714/795 |
| 5,872,817 A | * | 2/1999 | Wei .............................. | 375/341 |
| 6,011,813 A | * | 1/2000 | Ghosh ......................... | 375/233 |
| 6,012,161 A | * | 1/2000 | Ariyavisitakul et al. .... | 714/795 |
| 6,182,261 B1 | * | 1/2001 | Haller et al. ................. | 714/758 |
| 6,201,839 B1 | * | 3/2001 | Kavcic et al. ............... | 375/341 |
| 6,269,116 B1 | * | 7/2001 | Javerbring et al. .......... | 375/227 |
| 6,271,772 B1 | * | 8/2001 | Luschi et al. .................. | 341/51 |
| 6,292,918 B1 | * | 9/2001 | Sindhushayana et al. ... | 714/755 |
| 6,307,901 B1 | * | 10/2001 | Yu et al. ...................... | 375/233 |
| 6,438,180 B1 | * | 8/2002 | Kavcic et al. ............... | 375/341 |
| 6,459,728 B1 | * | 10/2002 | Bar-David et al. .......... | 375/231 |

* cited by examiner

Primary Examiner—Chi Pham
Assistant Examiner—Khanh Cong Tran
(74) Attorney, Agent, or Firm—Steve Mendelsohn; Ian M. Hughes

(57) ABSTRACT

A data transmission system employs an iterative decoder that applies decision feedback equalization (DFE) to channel output samples of a packet of data. The iterative decoder receives a stream of channel output samples as packets that may, for example, be read from a sector of a recording medium. Each packet may represent user data encoded, for example, with a concatenated code formed from N component codes, N a positive integer. The iterative decoder employs I decoding iterations, I a positive integer. DFE employs two filters: a feedforward filter and a feedback filter. The feedforward filter, which may be a whitened-matched filter used for detection, shifts dispersed channel output energy into the current sample. The feedback filter cancels energy of trailing inter-symbol interference from previous symbols. In each iteration by the iterative decoder, the DFE is applied to channel output samples of a packet by filtering with the feedforward filter, and then filtering with the feedback filter to cancel interference energy in the current sample from previous samples. The feedback filter uses soft information corresponding to tentative decisions for decoded data of the packet. During the first iteration, the soft information for applying DFE to the current sample is derived from the slicer output directly, and during the second and subsequent iterations the soft data of the decoder is provided to the feedback filter of the equalizer as soft information.

15 Claims, 3 Drawing Sheets

ITERATIVE DECODING OF DATA PACKETS EMPLOYING DECISION FEEDBACK EQUALIZATION

BACKGROUND OF THE INVENTION

1. Field of the Invention

The present invention relates to decoding of data packets received from a transmission channel, and, in particular, to an iterative decoder employing equalization of data packets.

2. Description of the Related Art

Many data transmission applications, including magnetic recording and wireless data communication systems, organize the data stream that is passed through a transmission channel into finite-length packets of data ("data packets"). The data may be user data that has been encoded using, for example, concatenated codes. A receiver that detects the data stream from the transmission channel first provides a sampled analog signal representing the encoded data as output channel samples. The term "output channel sample" refers to data that has passed through a transmission channel such as a magnetic medium and magnetic read head of a magnetic recording system, or the over-air path of the wireless communication systems. The transmission channel may include memory and has a form of frequency gain and phase response. The signal containing the encoded data has an added noise component, signal distortion, and intersymbol interference (ISI) caused by the physical channel's frequency response.

A receiver may employ an equalizer that applies decision feedback equalization (DFE) to the output channel samples representing the encoded data. DFE is a nonlinear method that utilizes previous decisions to cancel trailing ISI in the currently detected channel sample. DFE applies appropriate filtering of the current output channel sample and subtracts one or more appropriately filtered, previous decisions (those that contribute interference) from the current filtered output. Weights for filtering are selected based on a criterion, such as minimizing mean-square error.

Concatenated code systems for encoding and decoding user data use two or more component codes that are concatenated during the process of encoding data. Although the codes may be of any type, component codes are typically relatively simple codes, such as convolutional codes.

Concatenated code systems may employ iterative decoding of encoded data using either serial or parallel iterative decoding methods. Each of the serial or parallel iterative decoding methods may be employed for serial concatenated codes. Each of the serial or parallel iterative decoding methods may be employed for parallel concatenated codes. When employing iterative decoding of data encoded with a concatenated code, a block of data is input to the iterative decoder. The block boundaries desirably conform to symbol boundaries of the concatenated code. The iterative decoder comprises at least one decoding module having N component code decoders for decoding N component codes. Each decoding module and/or component code decoder typically includes a maximum a posteriori (MAP) decoder.

In an iterative decoding method, a block of the output channel samples representing encoded data is repetitively processed by the two or more decoding modules until a predetermined number (I) of decoding iterations are complete. An exemplary iterative decoder 100 employing serial iterative decoding is shown in FIG. 1. Each decoding module 101 performs a complete, "soft" decoding of the data encoded with a serial concatenated code. Each decoding module applies an iteration of the decoding process, and each iteration allows for higher confidence in the tentative decisions for bits in the output decoded data that are made based on the output channel samples of a detector. Each decoding module includes N component code decoders 110 (i.e., Decoder 1 through Decoder N). Each component code decoder corresponds to one of the N component codes employed by the concatenated code. Each of the component code decoders 110 may include, for example, a MAP decoder and a deinterleaver (not shown in FIG. 1).

For the implementation of iterative decoding shown in FIG. 1, I iterations of the decoding operations are performed on each block. A new block is applied to the first decoding module 101 as the previous data is applied to the next decoding module 101. The second decoding module 101 corresponds to the second decoding iteration. A fully decoded block is provided as output data from the Ith decoding module 101, corresponding to the Ith decoding iteration. Once all decoding modules 101 of iterative decoder 100 are loaded with data, the decoding process may occur in a pipeline fashion and/or continuously as each new block is applied. Loading data into decoding modules 101 of iterative decoder 100 may be either each decoding module 101 receiving a block for processing, or each component code decoder 110 receiving a block for processing.

SUMMARY OF THE INVENTION

The present invention relates to iteratively decoding a data packet that includes 1) applying decision feedback equalization to the data packet and 2) decoding of the packet for each iteration of the iterative decoding process. In accordance with an embodiment of the present invention, the iterative decoder first applies decision feedback equalization (DFE) to the data packet before or during a first decoding cycle of the data packet. An iteration of iterative decoding may be defined by completing both applying DFE to the packet and the corresponding decoding (in a decoding cycle) of the packet. For a second iteration, the iterative decoder applies DFE to the data packet during a second decoding cycle, wherein the DFE employs soft data generated by the decoding cycle for the data packet during the first iteration. In another embodiment, for each further iteration of decoding, DFE employs soft data generated for the data packet during the previous iteration of decoding. In another embodiment, during the first iteration the iterative decoder applies DFE to the current packet using a soft estimate of previous decisions, and the estimate may be generated by, for example, a slicer. A further embodiment of the present invention includes a decoder that may be either a serial or parallel iterative decoder. A further embodiment of the present invention is included in either a magnetic or a optical recording system; a wireless or cellular communication receiver; or a packet data network.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with the present invention, an iterative decoder applies decision feedback equalization (DFE) to channel output samples of packets. The iterative decoder receives packets of data as a stream of channel output samples that may be, for example, received from a storage medium or transmission channel. The iterative decoder employs I decoding iterations, I a positive integer. In each iteration of the iterative decoder, DFE is applied to channel output samples of a packet by filtering with a feedforward filter, which may also operate as a whitened matched-filter detector, and then filtering with a feedback filter to cancel trailing interference energy. The feedback filter may use soft information corresponding to tentative, previous decisions. During the first iteration, soft information may be generated by, for example, a slicer. The soft information of the first iteration used by the DFE process for the current sample is derived directly from previous decisions for samples of the packet. During the second and subsequent iterations the soft output data of the decoder is provided to the equalizer as soft input information to the feedback filter.

Figure 2:
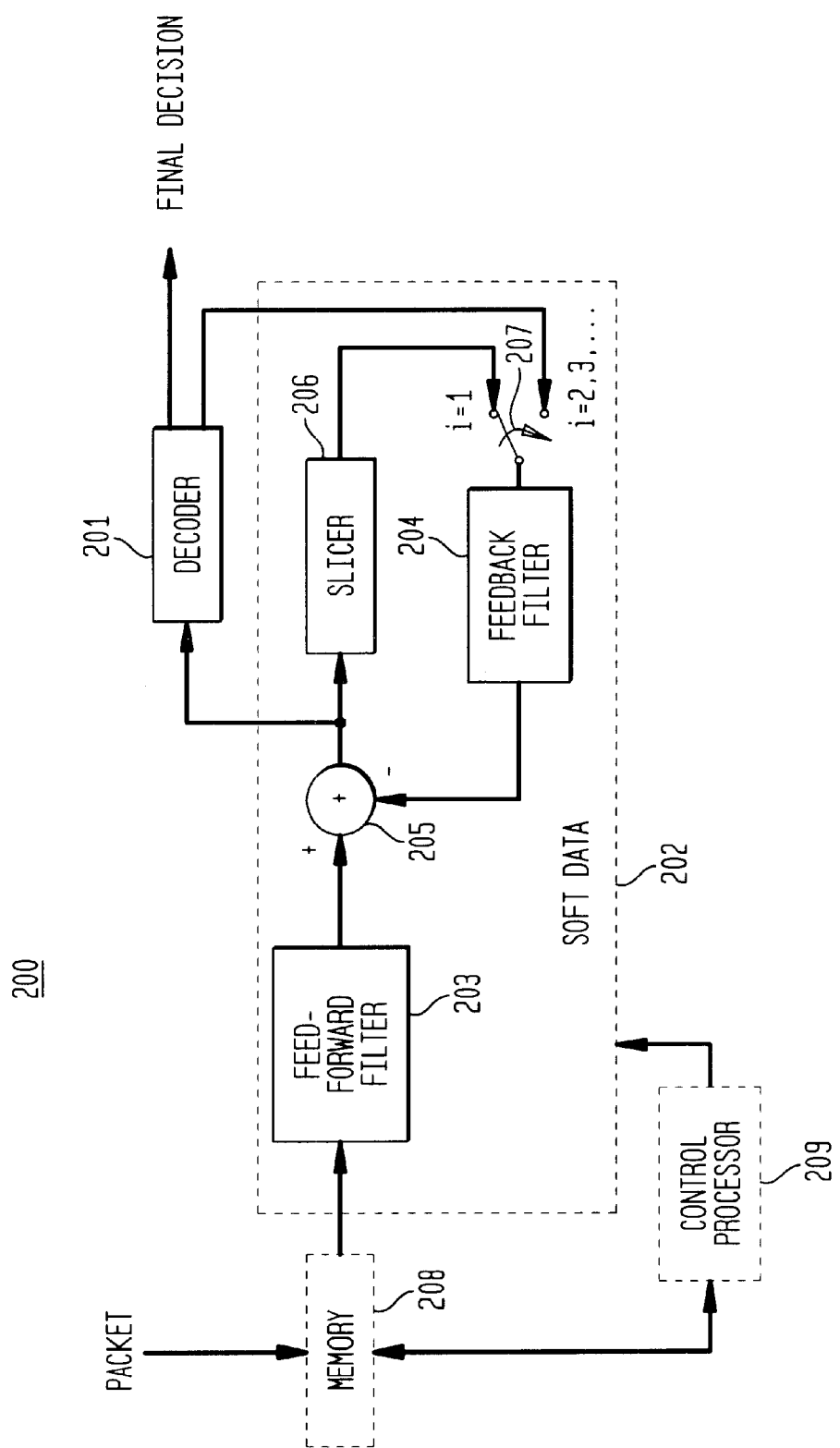
FIG. 2 shows an exemplary embodiment of a iterative decoder using decision feedback equalization in accordance with the present invention.

Such processing may allow for improved processing speed and error propagation properties of the iterative decoder. While the preferred embodiments are described as employed for implementations in magnetic recording systems, the present invention is not so limited. Embodiments of the present invention may be employed in other transmission systems in which iterative decoding of data packets may be employed (e.g., wireless communication systems, optical recording systems, and router interface cards of wired/wireless packet data networks). An iterative decoding system 200 according to one embodiment of the present invention and having decoder 201 and an equalizer 202 for applying DFE to output channel samples is shown in FIG. 2. Such iterative decoder may be implemented in hardware circuitry of, for example, an integrated circuit for increased processing speed. The equalizer comprises two filters: a feedforward filter 203 and a feedback filter 204. The equalizer also comprises summer 205, slicer 206, and switch 207. The equalizer 202 receives a stream of output channel samples in portions corresponding to separate packets. The decoder 201 may employ either serial or parallel iterative decoding, but, in general, the present invention may be employed with any iterative decoding method.

The first packet of data is applied to feedforward filter 203. A packet of data may be represented by a series of output channel samples corresponding to a portion of the stream of encoded user data. The encoded user data may represent bits each having a defined period. The encoded user data may be received from, for example, a recording, wireless, or other transmission medium as an analog signal that is sampled (and possibly oversampled) to provide the output channel samples.

Feedforward filter 203 shapes and shifts the channel energy of previous symbols into the current output sample. The previous symbols may correspond to several output channel samples and are also referred to in the art as precurser channel samples. The precurser energy of the one or more previous samples corresponds to dispersed energy of the current sample caused by the channel's memory characteristic spanning several samples (sample or bit periods). The filter characteristics are selected based on an optimal detection criterion. Feedforward filter 203 may typically be a whitened-matched filter implemented as a finite impulse response (FIR) filter spanning several bit periods in the time domain. Such FIR filter may have an all-pass gain characteristic over the frequencies of interest, but a phase characteristic selected to shift channel energy to the current sample (in the time domain).

Feedback filter 204 and summer 205 are used to cancel the trailing ISI in the current sample. Feedback filter 204 may also be implemented as an FIR filter having a transfer function related to the transfer function of the feedforward filter 203 and the impulse response of the transmission channel. Feedback filter 204 filters soft information for previous decision(s) (i.e., the temporary decisions for sample values corresponding to the previous symbols). Subtracting the output of the feedback filter 204 from the current output of feedforward filter 203 removes precurser energy of samples associated with the previous symbols. The filtered input soft information is subtracted from the current output channel sample in summer 205 to cancel the ISI contained in the current sample.

The following definitions are used herein to distinguish timing of operations for the exemplary embodiment shown in FIG. 2. A complete iteration of the iterative decoder system includes applying DFE to all samples of the packet, and then completing a cycle of decoding of the packet. A cycle of decoding includes receiving all samples of the packet into the decoder, decoding, and providing the decisions for the samples as soft data. However, during the first iteration a delay is inserted at the beginning and between the process of applying DFE and beginning the decoding cycle. These delays are inserted since the feedback filter 204 preferably includes a delay for passing soft information values into the filter that may be related to the number of taps of the filter.

The feedback filter 204 may be loaded with initial values, or a period may be required to first duplicate and shift a number of samples from the feedforward filter 203 through the slicer 206 equivalent to the number of filter taps. Similarly, after DFE is applied to all the samples of the packet, samples still remain in the filter. In addition, decisions now appear at the output of the decoder 201 as soft data. Consequently, The remaining values for decisions in the feedback filter 204 are shifted out the filter and a number of soft data decisions equivalent to the number of filter taps are shifted into the filter. Then applying DFE for the second iteration may start. Consequently, for some embodiments, the process of applying DFE during the first iteration may complete before the decoding cycle of the first iteration starts.

For the first iteration of the iterative decoder system 200, switch 207 is in a first position during the first cycle of decoding by decoder 201 to provide soft information from slicer 206 as input to feedback filter 204. After the first decoding cycle, switch 207 moves to a second position for subsequent iterations (until the Ith iteration of system 200) to provide soft data from decoder 201 as the soft information input to feedback filter 204.

After the feedback filter 204 removes the ISI, each DFE-processed sample is provided to slicer 206 during the first iteration. Slicer 206 provides a "rough" tentative decision corresponding to each of the channel output samples by converting the multi-level, multi-bit sample values to binary values. For example, the values of DFE-processed samples above a threshold may be converted to 1 and those below the threshold may be converted to "0". Slicer 206 may alternatively be implemented with logic to generate soft data (non-binary) values.

The sequence of DFE-processed samples is also provided from summer 205 to decoder 201. During this period, decoder 201 produces soft data that are tentative decisions corresponding to values of the samples of the packet. The complete packet is processed with DFE, and the delay period corresponding to shifting the output of the slicer 206 through the filter and loading the same number of soft data decisions from the output of decoder 201 is accounted for. During the decoding cycle, the DFE-processed output samples of the packet during the first iteration are decoded. The DFE-processed output samples of the packet appear at the output of decoder 201 as tentative decisions for user data represented by the packet. Decoder 201 is preferably an iterative decoder and produces the tentative decision based upon the coding method employed to encode the user data. Until a final decision is, made for each value of the packet at the Ith iteration of the iterative decoding process, decoder 201 produces soft information as tentative decisions for the values. For each iteration after the first iteration, the delay of the feedback filter 204 need no longer be accounted for since the processing and cyclic input from the decoder 201 occurs in a pipeline fashion.

Also shown in FIG. 2 are optional memory 208 and control processor 209. In addition to control of various operations of the decoder 201 and equalizer 202, control processor 209 may also control the position of the switch 207 based on knowledge of the current iteration of the decoder 201. Optional memory 208 may be employed to store and provide selected data packets to equalizer 202.

Figure 3:
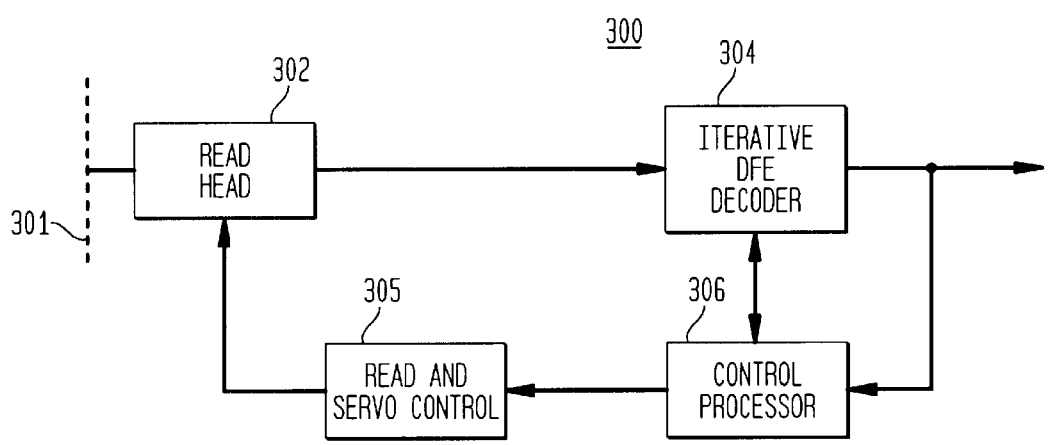
FIG. 3 shows a read side of a recording system employing an exemplary iterative decoder using decision feedback equalization in accordance with the present invention.

For some types of iterative decoding methods, such as those employed with serial iterative decoding when concatenated codes are used, pipeline processing may allow for processing of several packets at once through the system 200. For this case, coordination of the processing for the several packets may require coordination between the output channel samples and soft data from decoder 201 for each packet. Control processor 209 may be employed to control the process of providing packets from memory 208 to provide such processing coordination FIG. 3 shows the read side of a recording system 300 employing iterative decoding in accordance with one embodiment of the present invention. Recording system 300 may be included in, for example, a magnetic or an optical recording and playback system. Read head 302 receives an analog signal from recording medium 301. Recording medium 301 may be a magnetic or optical recording disk, and is desirably configured such that data and/or encoded data may be stored and read from the medium. For the exemplary recording system 300, data and/or encoded data are stored on the recording medium 301 as packets in sectors of tracks where, for example, one sector comprises 512 bytes (4096 bits). The analog signal is sampled and provided as output channel samples.

Figure 1:
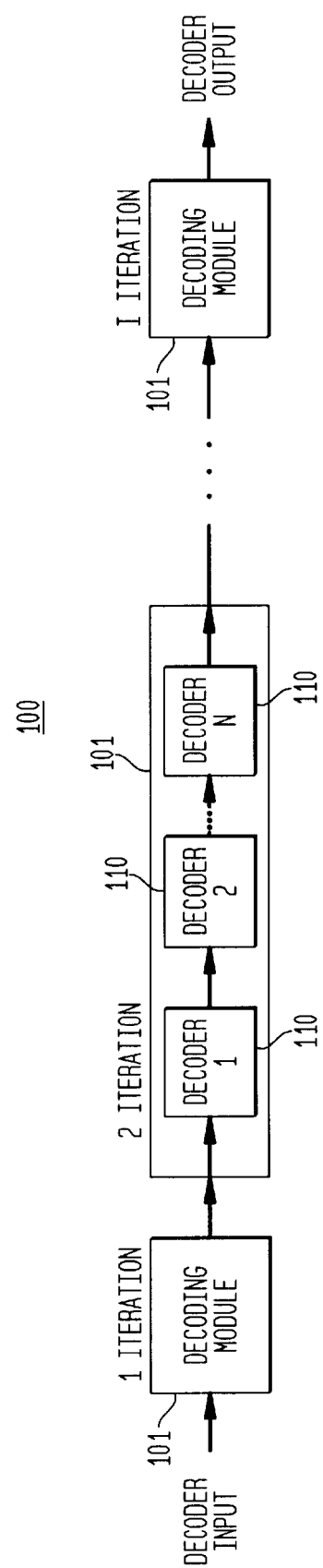
FIG. 1 shows a block diagram of an exemplary iterative decoder of the prior art employing serial iterative decoding.

The output channel samples are provided to iterative DFE decoder 304 which decodes the encoded data in accordance with the present invention. The iterative DFE decoder 304 may employ either a serial or parallel iterative decoding method with I iterations and N component code decodings if concatenated codes with N component codes are used to encode the data. In this case, the iterative DFE decoder 304 may have the form as described with respect to FIG. 1, and may generally include an iterative decoder that is a circular, or cyclical, processor in which data blocks (blocks of soft output samples) are sequentially loaded in, cyclically processed, and sequentially provided out.

Recording system 300 further comprises a control processor 306 and a read and servo control circuit 305. Control processor 306 may perform or oversee operations of the recording system 300, including data input and scheduling of decoding operations of iterative decoder 304, as well as control of operations during read mode and servo mode by transmitting control signals to the read and servo control circuitry 305. Read and servo control circuitry 305 controls the position of read head 302 over the recording medium 301 during read mode, and, in conjunction with commands from control processor 306, controls the search process and movement of the read head 302 during servo mode.

Figure 4:
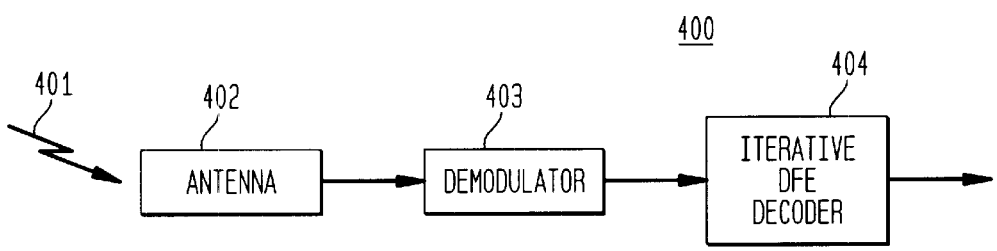
FIG. 4 shows a receiver of a telecommunication system employing an exemplary iterative decoder using decision feedback equalization in accordance with the present invention.

FIG. 4 shows the receiver of a telecommunication system 400 employing iterative decoding in accordance with one embodiment of the present invention. Antenna 402 receives a modulated analog signal from transmission medium 401. Transmission medium 401 may be the over-air interface of a wireless or cellular communication system. For the exemplary telecommunication system 400, encoded data is transmitted as a signal representing a stream of packets that modulated by a carrier and passed through the transmission medium 401. The analog signal is demodulated from the carrier by demodulator 403. The analog signal is sampled and provided as output channel samples to the equalizer employing DFE of iterative DFE decoder 404. The output channel samples are then provided to iterative DFE decoder 404 which decodes the encoded data of the received packets.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of iteratively decoding a data packet, comprising the steps of:

(a) applying decision feedback equalization (DFE) to the data packet during a first decoding iteration of the data packet; and (b) applying DFE to the data packet during a second iteration, wherein the DFE employs soft data generated for the data packet during the first iteration, wherein the soft data is generated by the step of decoding the data packet to which DFE is applied, the step of decoding being in accordance with a concatenated code.

2. The invention as recited in claim 1, further comprising step of (c) applying DFE to the data packet during one or more iterations after the second iteration, wherein for each iteration the step of applying DFE employs soft data generated for the data packet during the previous iteration.

3. The invention as recited in claim 1, wherein the data packet comprises a plurality of samples, and for steps (a) and (b), applying DFE includes the steps of feedforward filtering of the data packet to shift dispersed energy to a current sample; and feedback filtering of soft information derived from the feedforward-filtered data packet to reduce precurser energy in the current sample.

4. The invention as recited in claim 3, wherein, for step (a), feedback filtering employs soft information estimated from the plurality of samples of the packet.

5. The invention as recited in claim 3, wherein for step (b), feedback filtering employs as soft information the soft data generated by decoding the samples of the data packet to which DFE is applied in a previous iteration.

6. Apparatus for iteratively decoding data packets, comprising:

an equalizer for applying decision feedback equalization (DFE) to the data packet; and a decoder for decoding the data packet to provide soft data, wherein the equalizer applies DFE to the data packet during a first decoding iteration of the data packet; and applies DFE to the data packet during a second iteration, the DFE employing the soft data generated for the data packet during the first iteration, and wherein the soft data is generated by the decoder by decoding, in accordance with a concatenated code, the data packet to which DFE is applied.

7. The invention as recited in claim 6, wherein the equalizer applies DFE to the data packet during one or more iterations after the second iteration, wherein for each iteration the step of applying DFE employs soft data generated for the data packet by the decoder during the previous iteration.

8. The invention as recited in claim 6, wherein the data packet comprises a plurality of samples, and the equalizer comprises a feedforward filter and a feedback filter, the feedforward filter filtering the packet to shift dispersed energy to a current sample; and the feedback filter filtering of soft information derived from the feedforward-filtered data packet to reduce precursor energy in the current sample.

9. The invention as recited in claim 8, further comprising a slicer wherein the feedback filter employs soft information estimated by the slicer from the plurality of samples of the data packet.

10. The invention as recited in claim 8, wherein the feedback filter employs as soft information the soft data generated by decoding the samples of the data packet to which DFE is applied in a previous iteration.

11. The invention as recited in claim 1, wherein the iterative decoder is included in either a read side of a recording system, a receiver of a communication system, or an interface card of a packet network.

12. A computer-readable medium having stored thereon a plurality of instructions, the plurality of instructions including instructions which, when executed by a processor, cause the processor to implement a method for iteratively decoding data packets, the method comprising the steps of:

(a) applying decision feedback equalization (DFE) to the data packet during a first decoding iteration of the data packet, wherein the DFE employs soft information for the data packet in the first decoding iteration; and (b) applying DFE to the data packet during a subsequent iteration, wherein the DFE employs soft data generated for the data packet during a previous decoding iteration, wherein, for step (b), the soft data is generated by the step of decoding the data packet to which DFTE is applied, the step of decoding being in accordance with a concatenated code.

13. The invention as recited in claim 12, further comprising step of (c) applying DFE to the data packet during one or more iterations after the second iteration, wherein for each iteration the step of applying DFE employs soft data generated for the data packet during the previous iteration.

14. An integrated circuit having a decoder for iteratively decoding data packets, comprising:

a slicer generating decisions for a data packet, an equalizer for applying decision feedback equalization (DFE) to the data packet; and a decoder for decoding the data packet to provide soft data, wherein the equalizer applies DFE to the data packet during a first decoding iteration of the data packet and the DFE employs soft information for the data packet in the first decoding iteration; and wherein the equalizer applies DFE to the data packet during a subsequent iteration, the DFE employing the soft data generated for the data packet during a previous decoding iteration, and wherein the soft data is generated by the decoder by decoding, in accordance with a concatenated code, the data packet to which DFE is applied.

15. The invention as recited in claim 14, wherein the equalizer applies DFE to the data packet during one or more iterations after the second iteration, wherein for each iteration the step of applying DFE employs soft data generated for the data packet by the decoder during the previous iteration.

* * * * *

UNITED STATES PATENT AND TRADEMARK OFFICE
CERTIFICATE OF CORRECTION

PATENT NO.   : 6,570,919 B1
DATED        : May 27, 2003
INVENTOR(S)  : Inkyu Lee It is certified that error appears in the above-identified patent and that said Letters Patent is hereby corrected as shown below:

Column 8,
Line 5, replace "The invention as recited in claim 1" with -- The invention as recited in claim 6 --.
Line 24, replace "DFTE" with -- DFE --.

Signed and Sealed this

Ninth Day of September, 2003

JAMES E. ROGAN
*Director of the United States Patent and Trademark Office*